(12) United States Patent
Combs et al.

(10) Patent No.: US 9,522,973 B2
(45) Date of Patent: Dec. 20, 2016

(54) POLYURETHANE AND POLYISOCYANURATE RIGID FOAMS FOR ROOFING INSULATION

(71) Applicant: Covestro LLC, Pittsburgh, PA (US)

(72) Inventors: George G. Combs, McMurray, PA (US); Susan C. Pigott, Clinton, PA (US)

(73) Assignee: Covestro LLC, Pittsburgh, PA (US)

( * ) Notice: Subject to any disclaimer, the term of this patent is extended or adjusted under 35 U.S.C. 154(b) by 65 days.

(21) Appl. No.: 13/633,312

(22) Filed: Oct. 2, 2012

(65) Prior Publication Data

US 2014/0094530 A1    Apr. 3, 2014

(51) Int. Cl.
| | |
|---|---|
| C08G 18/42 | (2006.01) |
| C08G 18/76 | (2006.01) |
| C08J 9/00 | (2006.01) |
| C08J 9/14 | (2006.01) |
| C08G 101/00 | (2006.01) |

(52) U.S. Cl.
CPC ........... *C08G 18/42* (2013.01); *C08G 18/7664* (2013.01); *C08J 9/0014* (2013.01); *C08J 9/0066* (2013.01); *C08J 9/141* (2013.01); *C08G 2101/0025* (2013.01); *C08J 9/142* (2013.01); *C08J 9/149* (2013.01); *C08J 2203/182* (2013.01); *C08J 2375/04* (2013.01)

(58) Field of Classification Search
CPC .............. C08J 9/141; C08J 9/142; C08J 9/149
USPC ............................... 521/130, 131; 1/130, 131
See application file for complete search history.

(56) References Cited

U.S. PATENT DOCUMENTS

| | | | |
|---|---|---|---|
| 4,699,968 A * | 10/1987 | Kay et al. ........................ 528/61 |
| 4,797,428 A | 1/1989 | Reichmann | |
| 4,997,858 A * | 3/1991 | Jourquin et al. ............... 521/118 |
| 5,100,925 A * | 3/1992 | Watson et al. ................. 521/131 |
| 5,283,003 A * | 2/1994 | Chen ................................. 252/1 |
| 5,336,696 A | 8/1994 | Ashida | |
| 5,693,686 A * | 12/1997 | Szabat ................... C08G 18/70 252/182.2 |
| 5,776,992 A | 7/1998 | Jung et al. | |
| 5,801,210 A | 9/1998 | Radovich | |
| 5,981,612 A | 11/1999 | Keppeler et al. | |
| 6,319,962 B1 | 11/2001 | Singh et al. | |
| 6,753,357 B2 * | 6/2004 | Kalinowski et al. ......... 521/130 |
| 7,838,568 B2 * | 11/2010 | Letts et al. .................... 521/133 |
| 2001/0038973 A1 | 11/2001 | Witte et al. | |
| 2003/0038394 A1 * | 2/2003 | Haas ....................... C08G 18/10 264/109 |
| 2004/0162359 A1 | 8/2004 | Barber et al. | |
| 2004/0186194 A1 | 9/2004 | Joern et al. | |
| 2005/0159500 A1 | 7/2005 | Dreier et al. | |
| 2006/0100295 A1 | 5/2006 | Heraldo et al. | |
| 2008/0275152 A1 | 11/2008 | Hansel et al. | |
| 2009/0156704 A1 | 6/2009 | Stowell et al. | |
| 2009/0247657 A1 | 10/2009 | Kaplan et al. | |
| 2010/0294982 A1 * | 11/2010 | Schiller et al. .................. 252/75 |
| 2011/0039964 A1 * | 2/2011 | Wiliams ............. C08G 18/1808 521/131 |
| 2011/0257284 A1 | 10/2011 | Bruchmann et al. | |
| 2013/0141489 A1 * | 6/2013 | Roberts et al. .................. 347/20 |

FOREIGN PATENT DOCUMENTS

WO    9216573 A1    10/1992

OTHER PUBLICATIONS

Stepanpol® PS-2352 Product Bulletin from Stepan Company, accessed on the Stepan Company website on Dec. 16, 2015.*
Approval Standard for Class 1 Insulated Steel Deck Roofs, FM Approvals, Feb. 1989.
Nicola, W.J. et al, "Hydrocarbon Blown for U.S. Construction Applications", 35th Annual Polyurethane Technical/Marketing Conference, Oct. 9-12, 1994.
Rubinate 1850 MDI Technical Data Sheet. Huntsman. 2010.
Choe, K. H., Lee D. S., Seo, W. J. And Kim, W. N. Properties of Rigid Polyurethane Foams with Blowing Agents and Catalyst. Polymer Journal, vol. 36, 2004, pp. 366-373.

* cited by examiner

*Primary Examiner* — Melissa Rioja
(74) *Attorney, Agent, or Firm* — Donald R. Palladino; Lyndanne M. Whalen

(57) ABSTRACT

Polyurethane foams having a NFPA 101 Class B rating (ASTM E-84) which pass the FM 4450 calorimeter Test are produced by reacting: (a) an organic polyisocyanate, (b) at least one polyether polyol or polyester polyol with a nominal hydroxyl functionality of at least 2.0, (c) a blowing agent composition and (d) at least one halogen-free flame retardant. The blowing agent composition includes: (1) no more than 10% by weight, based on total weight of the foam-forming composition, of one or more hydrocarbons having an LEL less than 2% by volume in air, and/or (2) a hydrocarbon having an LEL greater than 2% by volume in air, and (3) up to 1% by weight, based on total weight of foam-forming composition, of water.

4 Claims, 1 Drawing Sheet

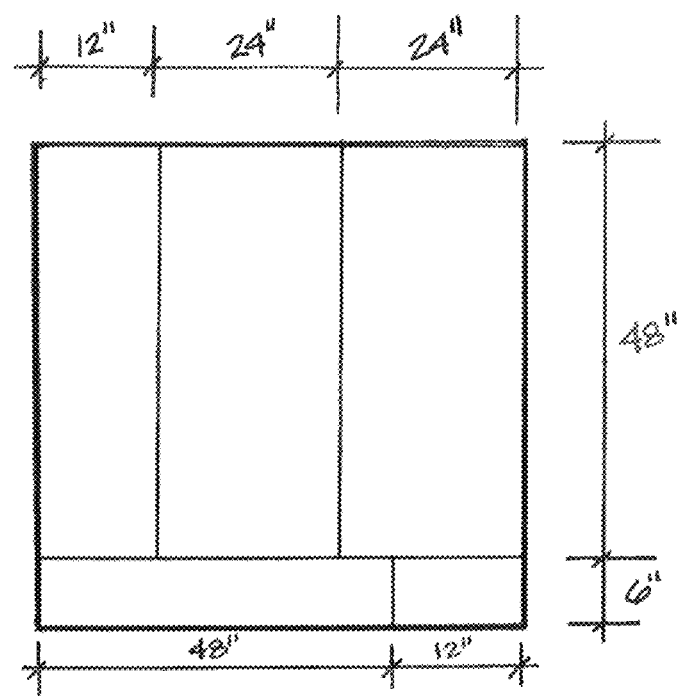

POLYURETHANE AND POLYISOCYANURATE RIGID FOAMS FOR ROOFING INSULATION

FIELD OF INVENTION

The present invention relates to flame retardant rigid polyisocyanurate and polyurethane foams (collectively referred to herein as "polyurethane(s)"), compositions for the production of such foams in which no halogenated flame retardant is included, and to processes for the production and use of such flame retardant polyurethane foams. The foams of the present invention meet the criteria for an NFPA 101 Life Safety Code designation as Class B performance in accordance with the requirements of ASTM E-84 (American Society of Testing Materials), "Standard Test Method for Surface Burning Characteristics of Building Materials" and also meet the criteria for Class 1 designation under Factory Mutual's FM 4450 standard, "Approval Standard for Class 1 Insulated Steel Deck Roofs".

BACKGROUND OF THE INVENTION

Halogenated flame retardants are used in rigid polyurethane foam insulation to ensure compliance with various flammability test protocols required by national, state, and local building code agencies. Halogenated flame retardants provide a cost-effective, efficient means to address performance criteria that have been made more difficult by substitution of hydrocarbon blowing agents for chlorofluorocarbons (CFC's), hydrochlorofluorocarbons (HCFC's), and expensive hydrofluorocarbons (HFC's).

Prior to concerns about the ozone depletion potential or global warming potential of halogenated blowing agents that had been commonly used in rigid foam insulation materials, it was relatively easy to obtain a Class A rating in ASTM E-84, "Standard Test Method for Surface Burning Characteristics of Building Materials" by simply using a halogenated blowing agent.

Under ASTM E-84, the test material must have a flame spread index (FSI) of 25 or less and a smoke-developed index (SDI) of 450 or less to attain a NFPA 101 Life Safety Code Class A designation. To attain a NFPA 101 Life Safety Code Class B designation under ASTM E-84, the test material must have a FSI less than or equal to 75 and an SDI of 450 or less.

The NFPA 101 Life Safety Code Class designations for ASTM-84 should not, however, be confused with the Class A, B, or C designations for ASTM E-108, "Standard Test Methods for Fire Tests of Roof Coverings".

ASTM E-108 is a test designed to determine the resistance of an entire roof assembly, not just the foamed plastic, to an external fire from three perspectives—spread of flame, intermittent flame, and burning brand. Foams used for insulation and roof coverings applied to a steel deck require only flame spread testing.

Although only a Class B E-84 rating is generally needed for foamed plastic insulation for an insulated steel deck assembly to meet the ASTM E-108 requirements of section 1505.1 of the International Building Code (IBC), steel deck assemblies insulated with rigid polyurethane foam also must pass the more severe Factory Mutual Roof calorimeter portion of FM 4450. An FM 4450 designation of Class 1 for an insulated steel roof deck assembly means that the deck assembly meets Factory Mutual's criteria for internal fire resistance, wind uplift, live load resistances, corrosion of metal parts, and fatigue of plastic parts. Generally, foam formulation plays a significant role in passing the combustibility performance requirement of the test standard while the foam manufacturer product specifications and installation procedures determine if the roof assembly meets the other requirements of the FM 4450 standard. It would be expected that a rigid foam product that meets the combustibility requirement should readily obtain a Class 1 rating since it is well known in the industry how to properly specify and install the product. A Roof calorimeter is used to test for internal fire resistance. It is desirable to pass FM 4450 Roof calorimeter testing without using either a thermal barrier between the insulation and the steel decking of the 4½ ft×5 ft. (1.37 m×1.52 m) mock roofing assembly or a protective cover board on top of the insulation layer of the assembly. The Roof calorimeter test measures fuel contributions from combustible materials (e.g., asphalt) from the deck to the fire underneath it by simulating a fire inside a building. The net fuel contribution cannot exceed predetermined maximum values as a function of time.

The ASTM E-84 Tunnel test method provides a comparative evaluation of flame spread and smoke generation for 24 feet (7.3 m) long by 20 inch (50.8 cm) wide samples placed horizontally in a tunnel furnace and exposed to a gas flame that provides 5000 Btu/min of heat. This method was originally developed and published by Underwriters Laboratories as UL 723 in 1950 and adopted by ASTM as a formal test method in 1961. There is a specified draft flow to move the flame front toward the end of the tunnel during the 10 minute test period and the values measured for flame spread and smoke levels are indexed to those obtained for the conditioned red oak flooring calibration standard, whose flame front reaches the end of the specimen after 5½ minutes. For rigid foam samples, a rapid initial spread of flame to the specimen's maximum value in the first 60 seconds followed by a recession of the flame front is often observed. Since the test method requires that the maximum distance of flame travel be used in the calculation, the flammability of gaseous blowing agents and their concentration in the foam play a significant role in rigid foam performance in this test.

Halogenated organophosphorus flame retardants in combination with halogenated blowing agents have historically been used to produce foams exceeding an NFPA 101 E-84 Class B rating in this test. These ratings are presumably due to phosphorus acting predominantly in the condensed phase to produce a char barrier and the halogen acting as a radical scavenger in the vapor phase.

Use of more flammable hydrocarbon blowing agents has necessitated foam formulation changes. Generally, the formulation change has been to increase the level of halogenated organophosphorus flame retardant in the rigid foam.

Recent concerns about human health effects and the environmental impact of polybrominated diphenyl ethers (PBDEs) led California to pass legislation imposing a statewide ban on these types of brominated flame retardants in 2003 and prompted Great Lakes Chemical Corporation to voluntarily phase out manufacture and importation of PBDEs into the U.S. in 2004. Subsequently, all halogenated flame retardants have come under greater public scrutiny and increased regulatory pressure.

Tris(2-chloroethyl) phosphate (TCEP) is no longer produced in Europe and may soon be banned in Canada from some household products and materials based on the Canadian government's Proposed Risk Assessment Approach for TCEP published in 2009.

A European Risk Assessment for the common flame retardant tris(2-chloro-1-methylethyl) phosphate (TCPP)

that was published in 2008 concluded that currently no need exists for "further information and/or testing and no need for risk reduction measures beyond those which are being applied already" with regard to human health and safety. Nonetheless, a number of studies measuring levels of halogenated organophosphorus flame retardants in consumer products and household dust have since appeared in peer-reviewed journals.

Consequently, efforts to develop rigid polyurethane foam products that are free of halogenated blowing agents and halogenated flame retardants that meet the flammability requirements for NFPA 101 Life Security Code Class B ratings in ASTM E-84 testing and pass the FM 4450 Roof calorimeter test have increased.

In 1994, Nicola and Weber published the results of their evaluation of pentane, isopentane, and cyclopentane as blowing agents for use in the production of laminated boardstock rigid foam at the 35th Annual Polyurethane Technical/Marketing Conference in a paper entitled "Hydrocarbon Blown Foams for U.S. Construction Applications." In this study, water was used as a co-blowing agent to minimize the pentane level. Chloroalkyl phosphate esters and brominated aromatic phthalate esters were used in combination with the water/pentane blowing agent to make polyisocyanurate rigid foam at a 240 index. These foams attained a Class A rating but did not meet key requirements for roofing applications in the Factory Mutual Roof calorimeter test (FM 4450). When the foam formulations were adjusted to meet this roofing requirement by increasing the index to 300, none of the tested samples were free of halogenated flame retardant.

Singh et al disclose a system for the production of rigid foam that meets NFPA 101 Class A rating in accordance with ASTM E-84 in U.S. Pat. No. 6,319,962. The Singh et al system includes an organic polyisocyanate, a polyfunctional isocyanate-reactive composition, less than about 1% by weight (based on total weight of the system) of water in combination with a hydrocarbon blowing agent, and at least one halogen-substituted phosphorus material. The halogen must be present at no more than 1.4% by weight of the total reactive system and the phosphorus is present at 0.3% to 2% by weight of the total reactive system.

Patent application U.S. 2006/0100295 describes an all liquid foam-forming system for rigid polyurethane foam that includes at least one liquid isocyanate or polyisocyanate, at least one aromatic polyester polyol, at least two halogenated flame retardants and water. The foam formed from this system has a density of at least 5 pounds per cubic foot (pcf) (80 kg/m$^3$) and an ASTM E-84 Class A rating.

U.S. Pat. No. 4,797,428 broadly discloses that a rigid flame retardant foam having a Class A rating is formed as the reaction product of organic polyisocyanate, an isocyanate-reactive mixture composed of 25% to 75% of an oligoester that is the reaction product of a dicarboxylic acid semi-ester and an alkylene oxide, and a blowing agent. Only halogenated compounds are disclosed as blowing agents/flame retardants in the patent and patent examples.

Not one of the above-described disclosures teaches a process or foam-forming composition for the production of a rigid polyurethane foam free of added halogens that performs as a NFPA 101 Class B foam in ASTM E-84 and that also passes the FM 4450 Roof calorimeter test protocol.

U.S. Patent Application 2009/0156704 discloses rigid foam compositions that include halogen-free alkyl aryl phosphate esters as flame retardants in combination with mixtures of hydrocarbon blowing agents and water. The foams produced from these compositions are classified as B2 or "normal combustibility" in accordance with DIN 4102.

To meet the criteria for B2 in DIN 4102, the average maximum flame spread of 5 specimens measuring 90 mm×190 mm cannot exceed 150 mm during the 20 second test after exposure to a 20 mm flame from a small burner for the first 15 seconds of the test. Obviously these conditions differ markedly from those required for the ASTM E-84 Tunnel Testing described above.

There is no correlation between performance in DIN 4102 B2 and performance in ASTM E-84. No claims are made that the rigid foam systems disclosed in U.S. Patent Application 2009/0156704 meet both the NFPA 101 Class B E-84 standard and the Class 1 FM 4450 standard.

U.S. Patent Application 2009/0247657 describes improvement of the thermal stability of polyurethane-modified polyisocyanurate foam by combining high molecular weight ammonium polyphosphate with halogenated and non-halogenated flame retardants in the foam formulations. However, thermal stability is only determined by thermogravimetric analysis of foam samples in nitrogen, which has little bearing on performance upon exposure to a flaming ignition source such as in ASTM E-84.

U.S. Pat. No. 5,776,992 teaches that properly blended mixtures of nitrogen-containing and nitrogen-free polyols in combination with ammonium polyphosphate can produce foams with a B2 classification in the DIN 4102 test while either polyol type used separately with the flame retardant is classified as B3. There is no teaching or suggestion that these systems meet the Class B E-84 standard or that roof assemblies composed of rigid foams made with these systems will pass FM 4450.

Consequently, a need still exits for a rigid polyurethane foam system that does not include a halogenated flame retardant or a halogenated blowing agent and will pass both ASTM E-84 with a NFPA 101 Class B rating and FM 4450 Roof calorimeter testing.

SUMMARY OF THE INVENTION

It is an object of the present invention to provide a foam-forming composition which when reacted forms a rigid polyurethane foam having a NFPA 101 Class B rating (ASTM E-84) that passes the FM 4450 Roof calorimeter test and does not include a halogenated flame retardant or a halogenated blowing agent.

It is also an object of the present invention to provide a process for the production of a rigid polyurethane foam having a NFPA 101 Class B rating (ASTM E-84) that passes the FM 4450 Roof calorimeter test from a foam-forming system that does not include a halogenated flame retardant or a halogenated blowing agent.

It is a further object of the present invention to provide rigid polyurethane foams having a NFPA 101 Class B rating (ASTM E-84) that pass the FM 4450 Roof calorimeter test and do not include a halogenated flame retardant or a halogenated blowing agent.

These and other objects which will be apparent to those skilled in the art are accomplished by (a) using halogen-free hydrocarbon blowing agents or mixtures thereof and limiting the amount of hydrocarbon blowing agents with Lower Explosive Limit (LEL) values less than 2% in air in the formulation and (2) using a halogen-free flame retardant. The term "halogen-free" is defined herein as the property or condition of a substance containing less than 0.3% of any halogen element such as fluorine, chlorine, bromine, or iodine.

BRIEF DESCRIPTION OF THE DRAWING

FIG. 1 illustrates the layout for the insulation boards for the roof assembly for the FM 4450 calorimeter Test conducted on foams produced in Examples 8-13.

DETAILED DESCRIPTION OF THE INVENTION

It has unexpectedly been found that use of 1 or more less flammable hydrocarbon blowing agents (i.e., hydrocarbons with LEL values greater than 2%) and blends of such less flammable hydrocarbon blowing agents with more flammable hydrocarbons (i.e., hydrocarbons with LEL values less than 2%) with non-halogen containing flame retardants in a foam-forming mixture is particularly advantageous because rigid polyurethane foams that can withstand exposure to the 5000 Btu/min flaming heat source applied in E-84 testing to the extent that a Class B designation can be obtained and that flammability criteria in FM 4450 testing are met. The halogen-free rigid polyurethane foams produced in accordance with the present invention can be made at lower density while still meeting the ASTM E-84 NFPA 101 Class B and passing the FM 4450 Roof calorimeter test standards for roofing applications.

The present invention will now be described for purposes of illustration and not limitation. Except in the operating examples, or where otherwise indicated, all numbers expressing quantities, percentages, functionalities and so forth in the specification are to be understood as being modified in all instances by the term "about".

The foam-forming compositions of the present invention include:
 a) at least 50% by weight based on total weight of the foam-forming composition, of an organic polyisocyanate,
 b) at least one isocyanate-reactive polyether or polyester polyol with a nominal functionality of at least 2.0,
 c) a hydrocarbon blowing agent mixture that includes:
  i. no more than 10% by weight, based on total weight of the foam-forming composition, preferably, no more than 8% by weight, most preferably, from 2 to 8% by weight, of one or more hydrocarbon compounds having individual LEL less than 2% by volume in air,
 and/or
  ii. one or more hydrocarbon compounds having an individual LEL greater than 2% by volume in air,
 and
  iii. up to 1% by weight, based on total weight of the foam-forming composition, of water,
and
 d) at least one halogen-free flame retardant compound.

These compositions produce a polyurethane foam having a density ranging from 1.60 pcf (25.6 kg/m$^3$) to 5 pcf (80.1 kg/m$^3$) that meets the NFPA 101 Class B ASTM E-84 standard and passes the FM 4450 Roof calorimeter test when reacted.

The LEL for a combustible gas is defined as the lowest concentration of that gas in air by volume that will ignite or catch fire in the presence of an ignition source. Hydrocarbon gases commonly used to make PIR rigid foam insulation include n-pentane, isopentane, and cyclopentane which have LEL values of 1.5%, 1.4%, and 1.1% at 20° C. and 1 atmosphere of pressure, respectively.

The LEL value for any gas or vapor can be found in the Material Safety Data Sheets from the suppliers of that material or in reference materials such as the NIOSH Pocket Guide to Chemical Hazards. The amount of these compounds used depends upon the desired foam density and may range from about 2% to 15% by weight, based on total weight of the system. Even though the blowing agent is only a small portion of the total foam-forming system, it exerts a disproportionate effect on flammability performance in tests where an ignition source is used in the presence of a controlled draft such as in the ASTM E-84 Tunnel test.

In the present invention, the amount of extremely flammable material or combination of materials with an LEL of less than 2% must be limited to no more than 10%, preferably, less than 8%, most preferably, from 2 to 8% by weight, based on total weight of the foam-forming system. Examples of suitable hydrocarbons having an LEL of less than 2% which are suitable as blowing agents in the foam-forming reaction mixtures of the present invention include: n-pentane, isopentane, cyclopentane, butane, hexane, 2,2-dimethylbutane, 2-methylpentane, butenes, hexenes, and pentenes. The most preferred extremely flammable hydrocarbon compounds are n-pentane, isopentane, cylcopentane and mixtures thereof with LEL values less than 2%.

Some water is included in the foam-forming mixture in an amount necessary to achieve the desired density as carbon dioxide generated by reaction of the water with the isocyanate acts as a co-blowing agent.

It is, of course, possible to use a combination of extremely flammable material(s) having an LEL of less than 2% with some amount of a slightly less flammable material having an LEL greater than 2% by volume in air. The amount of the less flammable hydrocarbon will vary depending upon the foam properties sought, e.g., density. Examples of suitable hydrocarbons having an LEL greater than 2% by volume in air include: acetone, acetaldehyde, dimethyl carbonate, dimethyl ether, methylal, ethyl formate, methyl acetate, and methyl formate. Methyl formate is most preferred.

In addition to the hydrocarbon blowing agent, some water is included in the blowing agent composition. The appropriate amount of water is determined on the basis of the desired foam density to be generated by the carbon dioxide gas co-blowing agent.

The amount of water included in the foam-forming reaction mixture will generally range from about 0.05% to about 1% by weight, based on total weight of the foam-forming system, preferably from about 0.10% to about 0.80%, most preferably, from about 0.10% to about 0.40% by weight.

The blowing agent composition of the present invention reduces the need for highly efficient vapor phase radical scavengers so that condensed phase flame retardants free of halogen can be used to produce Class B rigid foam systems.

For higher density foams (i.e., foams having a density of at least 1.80 pounds per cubic foot (28.8 kg/m$^3$), preferably, from 1.80 pcf (28.8 kg/m$^3$) to 5 pcf (80.1 kg/m$^3$), most preferably, from 1.85 pcf (29.6 kg/m$^3$) to 3 pcf (48.1 kg/m$^3$)) meeting the NFPA 101 Class B ASTM E-84 standard and passing the FM 4450 Roof calorimeter test, the blowing agent composition need only include (i) up to 1% by weight, based on total weight of foam-forming system, preferably, from 0.10% to 0.80% by weight, most preferably, from 0.10% to 0.40% by weight, of water to produce carbon dioxide ($CO_2$) as a co-blowing agent and (ii) less than 10% by weight, based on total weight of the foam-forming composition, preferably, from 2% to 10% by weight, most preferably, from 2% to 8% by weight, of one or more hydrocarbon compounds having LEL values less than 2%.

Generally, no hydrocarbon blowing agent with an LEL greater than 2% is required to prepare foams having densities greater than about 1.85 pcf (29.6 kg/m$^3$) with a halogen-free flame retardant. However, inclusion of a hydrocarbon blowing agent with an LEL greater than 2% in amounts of up to 5% by weight, based on total weight of foam-forming system is within the scope of the present invention. The optimum amount of hydrocarbon blowing agent with an LEL value of greater than 2% by volume in air to achieve a desired balance of flammability performance, thermal conductivity, compressive strength, and dimensional stability can be readily determined by those skilled in the art.

For lower density foams at the higher end of the FSI Class B range (i.e., foams having a density of less than 1.80 pcf (28.8 kg/m$^3$), preferably from 1.50 pcf (24 kg/m$^3$) to 1.85 pcf (29.6 kg/m$^3$), most preferably, from 1.60 pcf (25.6 kg/m$^3$) to 1.80 pcf (28.8 kg/m$^3$)), the blowing agent composition used to produce foams in accordance with the present invention need only include (i) one or more hydrocarbon compounds having an individual LEL less than 2% by volume in air and (ii) no more than 1% by weight, based on total weight of the foam-forming system, preferably, from 0.10% to 0.80% by weight, most preferably, from 0.10% to 0.40% by weight, of water. Although one or more hydrocarbons having an LEL value greater than 2% by volume in air may be included in the blowing agent composition for lower density foams in amounts of up to 5% by weight, it is preferred that no more than 2% by weight and most preferred that no hydrocarbon having an LEL value of greater than 2% by volume in air be included in such blowing agent composition.

For lower density foams with better flame spread performance (i.e., foams having a density of less than 1.80 pcf (28.8 kg/m$^3$), preferably from 1.50 pcf (24 kg/m$^3$) to 1.85 pcf (29.6 kg/m$^3$), most preferably, from 1.60 pcf (25.6 kg/m$^3$) to 1.80 pcf (28.8 kg/m$^3$)), the blowing agent composition used to produce foams in accordance with the present invention need only include (i) one or more hydrocarbon compounds having an individual LEL greater than 2% by volume in air and (ii) no more than 1% by weight, based on total weight of the foam-forming system, preferably, from 0.10% to 0.80% by weight, most preferably, from 0.10% to 0.40% by weight, of water. Although one or more hydrocarbons having an LEL value less than 2% by volume in air may be included in the blowing agent composition for lower density foams in amounts of up to 7% by weight, it is preferred that no more than 5% by weight and most preferred that no more than 2% of hydrocarbon having an LEL value of less than 2% by volume in air be included in such blowing agent composition.

The optimum amount of hydrocarbon is dependent upon the LEL for the compound or blend. Higher LEL values allow more blowing agent to be used in rigid foam production to lower density or increase isocyanate index.

Any of the known polyfunctional isocyanates may be used in the practice of the present invention. Examples of suitable polyisocyanates include: substituted or unsubstituted aromatic, aliphatic, and cycloaliphatic polyisocyanate compounds having at least two isocyanate groups.

Polyfunctional aromatic isocyanates are particularly preferred for making rigid polyurethane foam insulation. Examples of suitable aromatic isocyanates include: 4,4'-diphenylmethane diisocyanate (MDI), polymeric MDI (PMDI), toluene diisocyanate, allophanate-modified isocyanates, isocyanate-terminated prepolymers and carbodiimide-modified isocyanates. Polymeric MDI having an average NCO functionality of from 2.2 to 3.3 and a viscosity of from 25 to 2000 mPas and prepolymers of such polymeric MDI prepared with polyols or other oligomers or polymers such as polyether or polyester polyols that contain active hydrogen atoms. The most preferred PMDI has a functionality of from 2.2 to 3.0 and a viscosity less than about 800 mPas at 25° C. The organic polyisocyanate used in the foam-forming system of the present invention may, of course, be a mixture of such polyisocyanates.

The organic polyisocyanate(s) is/are included in the foam-forming system in an amount of at least 50%, preferably, from about 55% to about 75%, most preferably, from about 55% to about 67% by weight, based on total weight of the foam-forming system.

Any material having at least two reactive groups capable of reacting with an isocyanate group is suitable for use in the polyurethane-forming reaction mixtures of the present invention. Particularly preferred isocyanate-reactive materials include polyester and polyether polyols having at least two isocyanate-reactive end groups, preferably, from 2 to 8 isocyanate-reactive end groups, most preferably, from 2 to 6 isocyanate-reactive end groups and blends thereof are particularly suitable for the practice of the present invention. Aromatic polyesters are most preferred because of their generally higher thermo-oxidative stability. Examples of commercially available polyester polyols suitable for use in the practice of the present invention are those sold by the Stepan Company under the name Stepanpol and those sold by Invista under the name Terate. Polyester or polyether polyols that contain halogenated flame retardants or additives are not suitable for use in the halogen-free reactive systems and foams of the invention. Preferred polyols for use in the present invention will generally have functionalities of from 2.0 to 8.0 and hydroxyl numbers of from about 25 mg KOH/gm to about 1000 mg KOH/gm. More preferred are aromatic polyester polyols having hydroxyl numbers from about 100 mg KOH/gm to about 500 mg KOH/gm and functionalities of from 2.0 to about 2.5. Most preferred are blends of aromatic polyester polyols and polyester or polyether polyols that contain renewable content derived from incorporation of regenerable materials such as fatty acid triglycerides, sugars, or natural glycerin.

The polyol(s) is/are generally included in the foam-forming reaction mixture in an amount of from 10% to 45%, preferably, from 20% to 40%, most preferably, from 25% to 40% by weight, based on total weight of the foam-forming mixture.

Hydrocarbon blowing agents are used in the reactive systems of the present invention. The term hydrocarbon is used herein to refer to chemical compounds composed primarily of carbon and hydrogen that may contain heteroatoms such as oxygen, nitrogen, sulfur, or other elements excluding halogens. Halogenated blowing agents are not used in the practice of the invention. For purposes of description of the invention, extremely flammable hydrocarbon blowing agents are defined as compounds with LEL values less than 2% by volume in air and include n-pentane, isopentane, cyclopentane, butane, hexane, 2,2-dimethylbutane, 2-methylpentane, butenes, hexenes, and pentenes. The most preferred extremely flammable hydrocarbon compounds are n-pentane, isopentane, cylcopentane or mixtures thereof with LEL values less than 2% that comprise less than 10% based on total system weight of the total reaction system. Formulation compositions comprised of less than 8% by weight on total system weight of extremely flammable hydrocarbon blowing agents are even more preferred.

Slightly less flammable hydrocarbon compounds with LEL values equal to or greater than 2.0% by volume in air may be used in combination with extremely flammable blowing agents or used alone to further reduce flammability of the blowing agent mixture and/or produce rigid polyurethane materials with densities less than 1.85 lbs./ft$^3$ (29.6 kg/m$^3$). Less flammable hydrocarbon blowing agents with LEL values greater than or equal to 2.5% such as acetone, acetaldehyde, dimethyl carbonate, dimethyl ether, methylal, ethyl formate, methyl acetate, and methyl formate are preferred in the practice of this aspect of the invention with methyl formate being most preferred as the slightly less flammable hydrocarbon blowing agent.

Water also may be used in the practice of the invention to further control product density since it reacts with isocyanates to produce carbon dioxide gas as an auxiliary blowing agent. However, the thermal conductivity of $CO_2$ is generally higher than those of hydrocarbon blowing agents, so the amount of water in the formulation must be controlled to prevent negative effects on the insulating ability of rigid foam produced by the practice of the invention. Consequently, no more than 1% by weight of water based on total system weight is used in the reactive system and levels less than 0.8% are preferred in the practice of the invention.

Only halogen-free flame retardants are suitable for use in the reactive systems of the present invention. Suitable flame retardants may be nonreactive or reactive solids or liquids at normal temperatures and pressures. Halogen-free flame retardants, as that term is used herein, includes any compounds other than isocyanate-reactive materials that contain only carbon, hydrogen, oxygen and/or nitrogen that demonstrate a measurable improvement in flammability performance in ASTM E-84 when compared to the same reactive system without the flame retardant compound present. Suitable solid flame retardants include ammonium polyphosphates, melamine and its derivatives, borates, aluminum trihydrate (ATH), magnesium hydroxide, silicates, graphite, and nanoclay particles. However, liquid halogen-free flame retardants are preferred because equipment modifications are generally not required. Desirable halogen-free liquid flame retardants include halogen-free organophosphorus and silicone compounds. Suitable organophosphorus compounds include: phosphates, phosphonates, phosphites, phosphine oxides, phosphorus derivatives of iscyanate reactive materials such as diethyl N,N'-bis(2-hydroxyethyl) aminomethyl phosphonate and phosphate esters of the Exolit OP 500 series. Triethyl phosphate, tributyl phosphate, tributoxyethyl phosphate, oligomeric ethyl ethylene phosphate, bisphenol A bis(diphenyl phosphate), resorcinol bis(diphenyl phosphate), diethyl ethyl phosphonate, and dimethyl propane phosphonate are preferred organophosphorus compounds for practice of the invention.

Other additives known to be useful in the production of rigid foams such as surfactants, catalysts, processing aids, chain extenders, and cross-linkers may be added to the reactive systems of the present invention. Surfactants are generally copolymers of ethylene oxide/propylene oxide with polysiloxanes that control nucleation and cell-size distribution in the rigid foam and improve mixing of the blend components. Some of the commercially available surfactants include those of the Tegostab® series from Evonik such as Tegostab® 8513 and Tegostab® 8465. Amine catalysts promote reaction of active hydrogen compounds such as polyols and water with isocyanates and may, along with metal carboxylates, trimerize isocyanate groups into highly thermally stable isocyanurate linkages. Pentamethyldiethylenetriamine (PMDETA), dimethylcyclohexylamine, and tris 2,4,6-dimethylaminomethyl phenol are examples of suitable amine catalysts. Potassium octoate and acetate are examples of suitable metal carboxylate trimer catalysts.

Suitable amounts of such additives to be included in the foam-forming system of the present invention may be readily determined by those skilled in the art.

Foams meeting the NFPA 101 Class B ASTM E-84 standard and passing the FM 4450 Roof calorimeter test are produced by reacting the organic polyisocyanate and the isocyanate-reactive composition in the presence of a halogen-free hydrocarbon blowing agent and optionally, water. Any of the known techniques for producing a rigid polyurethane foam may be used.

The foams of the present invention are characterized by an NFPA 101 Class B rating measured in accordance with ASTM E-84 standard and by meeting the flammability criteria for an FM 4450 Class 1 rating. These foams are particularly useful for insulation applications and roofing assemblies.

Processes for producing foams from the foam-forming compositions of the present invention are known to those skilled in the art. Examples of suitable processes include the known methods for producing polyisocyanurate laminated board stock insulation, methods for producing free-rise bunstock rigid foam insulation, froth-forming method for continuously producing glass fiber reinforced insulation boards in accordance with teachings of U.S. Pat. No. 4,572,865, continuous or discontinuous methods.

EXAMPLES

The present invention is further illustrated, but is not to be limited, by the following examples in which all parts and percentages are parts by weight or percentages by weight, unless otherwise indicated.

Characteristics and flammability test results for foams prepared from the foam-forming systems of the present invention are reported in the Tables. All ASTM E-84 (UL 723) tunnel tests were done on 2.75" (7 cm) thick samples without facer at Underwriters Laboratories Northbrook, Ill. facility while FM 4450 calorimeter tests were done on nominal 1.5" (3.8 cm) thick samples with facer. Thicker samples typically produce more smoke and higher flame spread in the tunnel and thinner samples are more likely to fail the calorimeter test. It is particularly noteworthy that inventive Example 13 made with 100% pentane as a blowing agent and inventive Example 10 made with an 80/20 blowing agent blend of pentane and methyl formate performed so poorly relative to the halogenated control comparative Example 8 in the predictive lab muffle furnace test. However, both samples easily passed the full-scale FM 4450 Roof calorimeter test. This observation supports the performance requirement that rigid foams of the invention with a Class B rating must pass the Factory Mutual test since smaller scale test results may be misleading.

Hand-Mix Lab Foam Preparation Procedure

All B-side components (i.e., components included in the isocyanate-reactive component) with the exception of the blowing agent were blended with a mechanical flat blade turbine mixer. Blowing agent was added to the B-side resin blend and mixed briefly before the isocyanate was added and the resultant mixture was mixed at high speed for about 5 seconds. The mixture was then poured into a 12" (30.5 cm)×12" (30.5 cm)×2.5" (6.4 cm) cardboard box and the foam was allowed to rise freely. The rising foam surface was gently probed with a wooden stick to determine string gel and tack free time. In instances where a sample was needed to perform the Bayer Mini Tunnel Test (described below), the foam mixture was poured into two 14" (35.6 cm)×6⅜" (16.2 cm)×4" (10.2 cm) cardboard boxes so that four 12" (30.5 cm)×6⅞" (17.5 cm)×1" (2.5 cm) samples could be cut from the foam cores.

Bayer Alpha Mini Tunnel Test

Performance in this small scale tunnel test roughly correlates to results obtained in the Steiner Tunnel used to conduct ASTM E-84 testing. Core foam samples are cut to 6⅞" (17.5 cm)×48" (121.9 cm)×up to 2" (5.1 cm) thick. Multiple foam samples of equal length can be used for a total length of 48 inches (121.9 cm). Typically three sample sections 16 inches (40.6 cm) long are used to simulate the three 8' (243.8 cm) long samples in the full scale test. The sample sections are placed in the tunnel and ignited by the burner that is positioned such that the flame tip is 14" (35.6 cm) from the start end of the tunnel. Progression of the flame from the burning foam along the tunnel is recorded at timed intervals by an operator observing through windows installed in the tunnel "floor". The operator actually monitors the flame by looking at the flame reflection in an angled mirror positioned underneath clear window "floor" of the raised tunnel apparatus. An optical sensor in the tunnel ventilation system gathers data that is used to calculate the smoke index. The Flame Spread Constant of a 48 inch (121.9 cm) sample ($FSC_{48}$) is calculated using the following equation:

$$\frac{\text{Average Distance} - 14}{FSC_{48}} = \frac{29.9 - 14}{22}$$

Based on historical comparisons of results obtained for samples tested in both the Steiner Tunnel and the Bayer Alpha Mini Tunnel, a $FSC_{48}$ of 28 or less and a smoke index of 200 or less is expected to correspond to an E-84 flame spread index of 25 or less with a smoke index of 450 or less. The alpha tunnel test does not correlate well with foam samples having a flame spread index (FSI) greater than 35 in the large scale ASTM E-84 tunnel test since the flame spread of such foams usually exceeds 48 inches (121.9 cm) in the lab tunnel.

Bayer Muffle Furnace Test

This test was designed to compare behavior of test materials to that of controls that are known to pass requirements of the Factory Mutual Roof calorimeter test (FM 4450). A foam sample with dimensions of 4" (10.2 cm)×4" (10.2 cm)×up to 2.5" (6.4 cm) was completely wrapped in aluminum foil. The mass of the foil and foam were recorded separately along with the foam height. A small muffle furnace containing a removable open top metal compartment sized to hold the foam sample was preheated to 450° C. The oven was opened briefly to insert the foil-wrapped foam sample into the metal holder and the foam was heated for 20 minutes at 450° C. The metal holder was removed from the oven and allowed to cool. The weight of foil-wrapped foam sample was recorded before gently un-wrapping the foam to measure and record its residual height at the sample's thinnest section of remaining foam. Also, the height of any foam area free of char was recorded. Test results are reported as % weight lost, % height retained, and the amount of "no char" in inches. The results are compared to those of a control sample that is known to pass the Roof calorimeter test with the expectation that the experimental sample will pass also if its results are equal to or better those of the control. However this assumption typically is only valid for samples prepared via a high-pressure mixing machine process as would be used to make the commercial product. As illustrated in Table 2, muffle furnace results for hand-mixed lab foams can differ markedly from those obtained using the same formulation on the laminator machine.

Pilot Line Laminator Unit

PIR laminated boardstock foam samples were prepared on Bayer's pilot-scale Hennecke unit at the Pittsburgh, Pa. USA facility. The laminator was approximately 26 feet (7.9 m) long and equipped with a single mix-head which made boards that were 30 inches (76.2 cm) wide. The mix-head was outfitted with a two-stream "T" made with CPVC piping. The B side resin blend (i.e., polyol-containing component) was premixed with the third-streamed blowing agent inline via a special Triple Action Dispersion Device (TADD) from Komax, Inc. prior to entering the static mixer and exiting the mix-head after being subjected to impingement mixing at 1800 psi (126.6 kg/cm$^2$) to 2500 psi (175.8 kg/cm$^2$). The conditions used for foams made in this study were as follows:

| | |
|---|---|
| Total Feed Rate | 22 to 45 lbs./min (10-20.4 kg/min) |
| Resin Temperature | 82° F. |
| Isocyanate Temperature | 82° F. |
| Platen Temperature | 145° F. |
| Line Speed | 34 to 38 ft./min (10.4-11.6 m/min) |

The nominal board thickness for tested foams in Table 3 was set at 1.5 inches (3.8 cm) unless otherwise noted and the foam was laminated with black facer. The board was perforated on the top surface using a weighted spiked roller as it exited the unit.

ASTM E-84 (UL 723) Tunnel Testing

All foam samples for this test were prepared at a nominal thickness of 3.0" (7.6 cm) with standard black facer. The top and bottom ¼" (0.6 cm) of foam was slit from the boards to remove the facer. The slit samples were tested at Underwriters Laboratories Fire Protection facilities in Northbrook, Ill. as developmental materials.

Roof Assembly for FM 4450 Calorimeter Test

The roof assembly was built by personnel at Factory Mutual's test laboratory in West Glocester, R.I. and was composed of the following layered sequence:
1. Approved 18 gauge steel deck.
2. Rigid foam roof insulation samples with standard black facer, mechanically attached to the deck.
3. 3 ply organic felt Built-Up roof with hot asphalt applied at 25 lbs. per 100 square feet (1.22 kg/m$^2$).
4. 60 lb. (27.2 kg) flood coat of asphalt.

The layout for installation of these roof insulation boards was slightly different from the conventional diagram based on 48-inch (122 cm) wide commercial product and is shown in FIG. 1. In the conventional assembly, a 36-inch (91.4 cm) wide panel and 24-inch (61 cm) wide panel form a single vertical seam in the assembly, but the installation used for testing of roofing assemblies made with the foams of the present invention required that two vertical seams using two 24-inch (61 cm) wide boards and a single 12-inch (30.5 cm) wide panel be used because the pilot laminator unit could only make boards with a maximum width of 30 inches (76.2 cm). No thermal barrier was used between the deck and foam insulation and no cover board was used on top of the foam insulation.

Various formulations used to prepare rigid polyurethane foams based on the inventive reactive systems are shown in Tables 1, 2 and 3. The amounts listed in Tables 1, 2 and 3 are parts by weight.

The materials used to produce the foams in the Examples which follow were:

POLYOL: Stepanpol® PS-2352 polyester polyol having a functionality of 2 and an OH Value of 235 which is commercially available from the Stepan Company.

K-15: Potassium octoate which is commercially available under the name Dabco® K-15 from Air Products Company, PMDETA: pentamethyldiethylenetriamine available under the name Desmorapid® PV from Bayer MaterialScience.

Polycat 46: Potassium acetate available under the name Polycat® 46 from Air Products Company.

B 8513: Surfactant available under the name Tegostab® B 8513 from Evonik Industries.

PCF: Halogenated flame retardant which is commercially available under the name Fyrol® PCF from ICL-Supresta.

TEP: Halogen-free flame retardant triethyl phosphate commercially available from Eastman Chemical.

TEP-Z: Halogen-free flame retardant commercially available under the name Levagard® TEP-Z available from Lanxess.

RDP: Resorcinol bis(diphenyl phosphate), halogen-free flame retardant which is commercially available under the name Fyrolflex® RDP from ICL-Supresta, n-Pentane: The blowing agent n-pentane.

MF: The blowing agent methyl formate.

NCO: Polymeric MDI which is commercially available under the name Mondur® 489 from Bayer MaterialScience.

TABLE 1

| Hand-Mixed Foams | | | |
|---|---|---|---|
| Example | 1 | 2 | 3 |
| POLYOL | 29.55 | 27.42 | 33.00 |
| TEP | 2.25 | — | 3.50 |
| RDP | — | 3.56 | — |
| B 8513 | 0.72 | 0.54 | 0.76 |
| K-15 | 1.44 | 1.19 | 1.06 |
| Polycat 46 | 0.23 | 0.23 | — |
| PMDETA | 0.11 | 0.21 | 0.08 |
| Water | 0.22 | 0.10 | 0.15 |
| n-Pentane | 5.61 | 6.75 | 6.47 |
| NCO | 60.3 | 60.0 | 55.0 |
| Index | 2.75 | 2.75 | 2.50 |
| Density (pcf) [kg per m$^3$] | 1.75 [28] | 1.76 [28.2] | 1.73 [27.7] |
| Mini Tunnel | | | |
| FSC | 37 | 38 | — |
| SDI | 218 | 170 | — |

TABLE 2

| Muffle Furnace Results: Hand-Mix vs Machine (Laminator) | | | | |
|---|---|---|---|---|
| Example | 4* Hand-mix | 5* Hand-mix | 6* Laminator | 7* Laminator |
| POLYOL | 28.00 | 28.00 | 28.08 | 28.08 |
| PCF | 3.70 | 3.70 | 3.71 | 3.71 |
| B-8513 | 0.70 | 0.70 | 0.70 | 0.70 |
| K-15 | 1.42 | 1.42 | 1.42 | 1.42 |
| Polycat 46 | 0.22 | 0.22 | 0.22 | 0.22 |
| PMDETA | 0.11 | 0.11 | 0.12 | 0.12 |
| Water | 0.14 | 0.14 | 0.14 | 0.14 |
| n-pentane | 6.12 | 6.12 | 6.02 | 6.02 |
| NCO | 59.58 | 59.58 | 59.58 | 59.58 |
| Index | 3.00 | 3.00 | 3.00 | 3.00 |
| Density (pcf) [kg/m$^3$] | 1.75 [28] | 1.75 [28] | 1.71 [27.4] | 1.74 [27.9] |
| Thickness, Initial (in.) [cm] | 1.99 [5.1] | 1.48 [3.8] | 2.18 [5.5] | 1.64 [4.2] |
| Muffle Furnace | | | | |
| Height, % Retention | 83 | 81 | 57 | 47 |
| Weight, % Lost | 37 | 37 | 44 | 46 |
| No Char (in.) [cm] | 0.65 [1.7] | 0.44 [1.1] | 0.61 [1.5] | 0.30 [0.8] |

*Comparative Example

TABLE 3

| Laminator Board Samples | | | | | | |
|---|---|---|---|---|---|---|
| Example | 8* | 9 | 10 | 11 | 12 | 13 |
| POLYOL | 28.04 | 29.47 | 29.14 | 29.07 | 28.40 | 33.00 |
| PCF | 4.01 | — | — | — | — | — |
| TEP | — | 2.25 | 3.55 | — | — | 3.50 |
| RDP | — | — | — | 3.58 | 5.62 | — |
| B 8513 | 0.70 | 0.72 | 0.71 | 0.71 | 0.70 | 0.76 |
| K 15 | 1.42 | 1.42 | 1.41 | 1.42 | 1.42 | 1.06 |
| Polycat 46 | 0.22 | 0.23 | 0.23 | 0.23 | 0.23 | — |
| PMDETA | 0.11 | 0.11 | 0.11 | 0.11 | 0.11 | 0.08 |
| Water | 0.14 | 0.22 | 0.22 | 0.22 | 0.21 | 0.15 |
| n-Pentane | 5.88 | 4.21 | 4.11 | 4.23 | 4.14 | 6.47 |
| MF | — | 1.05 | 1.03 | 1.06 | 1.03 | — |
| NCO | 59.5 | 60.3 | 59.5 | 59.4 | 58.1 | 55.0 |
| Index | 3.00 | 2.75 | 2.75 | 2.75 | 2.75 | 2.50 |
| Density (pcf) [kg/m$^3$] | 1.73 [27.7] | 1.78 [28.5] | 1.78 [28.5] | 1.79 [28.7] | 1.71 [27.4] | 1.67 [26.8] |

TABLE 3-continued

Laminator Board Samples

| Example | 8* | 9 | 10 | 11 | 12 | 13 |
|---|---|---|---|---|---|---|
| Bd. Thickness (in.) | 1.67 | 1.64 | 1.62 | 1.65 | 1.69 | 1.70 |
| [cm] | [4.2] | [4.2] | [4.1] | [4.2] | [4.3] | [4.3] |
| Compressive Strength | 14.6 | 14.4 | 17.0 | 18.8 | 16.1 | 15.8 |
| 10% Defl. (psi) | [1] | [1] | [1.2] | [1.3] | [1.1] | [1.1] |
| [kg/cm$^2$] | | | | | | |
| Init. K-factor @ 35° F., Btu-in./hr.ft$^{2\circ}$ F. | 0.158 | 0.157 | 0.154 | 0.156 | 0.157 | 0.161 |
| Mini Tunnel | | | | | | |
| FSC | 33 | 34 | 34 | 35 | 32 | 33 |
| SDI | 107 | 206 | 195 | 172 | 131 | 97 |
| Muffle Furnace | | | | | | |
| Height, % Retention | 49.7 | 2.4 | 2.5 | 68.6 | 71.5 | 10.2 |
| Weight, % Lost | 48.8 | 52.6 | 50.3 | 49.0 | 49.1 | 52.0 |
| No Char (in.) [cm] | 0.145 [0.37] | 0 | 0 | 0.495 [1.26] | 0.385 [1] | 0 |
| ASTM E-84 | | | | | | |
| Thickness (in.) [cm] | — | 2.75 [7] | — | 2.75 [7] | 2.75 [7] | 2.75 [7] |
| Density (pcf) [kg/m$^3$] | — | 1.71 [27.4] | — | 1.75 [28] | 1.71 [27.4] | 1.54 [24.7] |
| FSI | — | 45 | — | 40 | 35 | 1 65 |
| SDI | — | 170 | — | 145 | 150 | 195 |
| NFPA 101 Rating | — | Class B | — | Class B | Class B | Class B |
| FM Calorimeter Fuel Contribution Rates | | | | | | |
| BTU/ft.$^2$/min. | Pass | — | Pass | Pass | Pass | Pass |
| 3 min. (410 max) | 190 | — | 207 | 89 | 118 | 246 |
| 5 min. (390 max) | 1190 | — | 207 | 89 | 117 | 244 |
| 10 min. (360 max) | 159 | — | 205 | 89 | 117 | 243 |
| 30 min. Avg. (285 max) | 133 | — | 154 | 87 | 87 | 167 |

*Comparative Example

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A polyurethane foam having a density less than 1.8 pounds per cubic foot and having a NFPA 101 Class B rating in accordance with the requirements of ASTM E-84 and which passes an FM 4450 calorimeter Test comprising the reaction product of a foam forming composition comprising:
   a) at least 55% by weight based on total weight of foam-forming composition of an organic polyisocyanate,
   b) an isocyanate-reactive composition comprising at least one polyether polyol or polyester polyol with a nominal hydroxyl functionality of at least 2.0,
   c) a blowing agent composition comprising:
     (1) greater than 0 to no more than 10% by weight, based on total weight of foam-forming composition, of one or more hydrocarbons having an LEL less than 2% by volume in air,
     and
     (2) greater than 0 and no more than 5% by weight, based on total weight of foam-forming composition, of a hydrocarbon having an LEL greater than 2% by volume in air,
     and
     (3) greater than 0 and up to 1% by weight, based on total weight of foam-forming composition, of water,
   and
   d) at least one halogen-free flame retardant;
   and wherein the polyurethane foam-forming composition contains no halogenated flame retardant or halogenated blowing agent.

2. The foam of claim 1 in which the one or more hydrocarbons having an LEL less than 2% by volume in air comprises n-pentane.

3. The foam of claim 2 in which the hydrocarbon having an LEL greater than 2% by volume in air is methyl formate.

4. The polyurethane foam of claim 1, with the proviso that the polyurethane foam-forming composition contains no ammonium polyphosphate.

* * * * *